United States Patent [19]

Enoki et al.

[11] Patent Number: 5,256,743

[45] Date of Patent: Oct. 26, 1993

[54] POLY(ARYLENE THIOETHER) RESIN COMPOSITIONS AND EXTRUDED PRODUCTS THEREOF

[75] Inventors: Toshio Enoki; Yasuo Sakaguchi, both of Iwaki, Japan

[73] Assignee: Kureha Kagaku Kogyo K.K., Tokyo, Japan

[21] Appl. No.: 654,464

[22] Filed: Feb. 13, 1991

[30] Foreign Application Priority Data

Mar. 5, 1990 [JP] Japan .................................. 2-53344

[51] Int. Cl.$^5$ .............................................. C08L 81/06
[52] U.S. Cl. ...................................... 525/537; 528/388
[58] Field of Search ........................................... 525/537

[56] References Cited

U.S. PATENT DOCUMENTS 3,988,286 10/1976 Edmonds, Jr. et al. ............ 260/37 R
4,645,826 2/1987 Iizuka et al. ........................ 528/388

FOREIGN PATENT DOCUMENTS 0189895 1/1986 European Pat. Off. .
0237006 3/1987 European Pat. Off. .
0257228 6/1987 European Pat. Off. .
0260871 9/1987 European Pat. Off. .
0286298 3/1988 European Pat. Off. .
59-11357 1/1984 Japan .
59-47590 3/1984 Japan .
59-85747 5/1984 Japan .
59-145131 8/1984 Japan .
59-198120 11/1984 Japan .
59-223753 12/1984 Japan .
62-90216 4/1987 Japan .
2205672 5/1987 United Kingdom .

Primary Examiner—Melvyn I. Marquis
Assistant Examiner—Helen F. Lee
Attorney, Agent, or Firm—Lowe, Price, LeBlanc & Becker

[57] ABSTRACT

Disclosed herein is a poly(arylene thioether) resin composition comprising 100 parts by weight of a poly(arylene thioether) (A) having a shear rate dependence value of melt viscosity at 310° C. of 2.2–3.0 and a crystallization temperature of 175°–210° C., and 20–400 parts by weight of a poly(arylene thioether) (B) having a shear rate dependence value of melt viscosity at 310° C. of 1.0–2.0 and a crystallization temperature of 220°–260° C. The resin portion consisting of the poly(arylene thioethers) (A) and (B) in the resin composition has a melt viscosity of 1,400–3,500 poises as measured at 310° C. and a shear rate of 1,200 sec$^{-1}$, a shear rate dependence value of melt viscosity at 310° C. of 1.5–2.3, and a crystallization temperature of 205°–230° C. Extruded products such as a tubular extruded article obtained from the resin composition are also disclosed.

4 Claims, No Drawings

POLY(ARYLENE THIOETHER) RESIN COMPOSITIONS AND EXTRUDED PRODUCTS THEREOF

FIELD OF THE INVENTION

The present invention relates to compositions of a poly(arylene thioether) (hereinafter abbreviated as "PATE") resin, and more specifically to PATE resin compositions improved in extrudability, impact resistance and heat resistance.

The resin compositions according to this invention are particularly suitable for use in extrusion, and permit the provision of, for example, tubular extruded articles excellent in impact resistance, heat resistance, strength properties, etc.

BACKGROUND OF THE INVENTION

PATE is a crystalline thermoplastic resin excellent in heat resistance, chemical resistance, flame retardance, stiffness, etc. These properties are improved by increasing the degree of crystallinity of PATE.

Formed products of PATE generally exhibit a tendency to lower their toughness, impact resistance, etc. as their degrees of crystallinity are increased. Besides, PATE improved in crystallinity is inferior in melt extrudability because its melt viscosity rapidly decreases upon its melt extrusion and the rate of crystallization in its cooling process after the extrusion becomes faster. More specifically, such a PATE is accompanied by problems of great drawdown and poor shape retention upon its melt extrusion, and also breaking of an extrudate upon taking off through a die, lowered dimensional accuracy of extruded products, etc.

Therefore, various forming processes have been investigated and attempted in order to overcome such drawbacks as to the extrudability of PATE and the physical properties of its extruded products.

For example, it has been proposed in Japanese Patent Application Laid-Open No. 47590/1984 to use, as a core material, a pipe made of a poly(phenylene sulfide) (hereinafter abbreviated as "PPS") and cover the core material with a fiber-reinforced thermosetting resin into a composite resin pipe, thereby offsetting the insufficient strength of the PPS pipe.

In Japanese Patent Application Laid-Open No. 85747/1984, it has been proposed to insert a PPS pipe inside a metallic pipe and join them to each other into a composite pipe, thereby improving the insufficient strength and stiffness of the PPS pipe.

It has been disclosed in Japanese Patent Application Laid-Open No. 145131/1984 to offset the insufficient strength of a PPS pipe by applying a thermoplastic resin other than PPS, for example, rigid polyvinyl chloride, polypropylene, nylon or the like, outside the PPS pipe.

In order to improve poor formability of PPS, such as a difficulty of shape retention due to the lowered melt viscosity upon its extrusion, or occurrence of cracks, which is contingent to the crystallization and shrinkage upon its compression molding, it has been disclosed in Japanese Patent Application Laid-Open No. 198120/1984 to unite reinforcing fibers of at least 3 mm in length to the PPS and then wind the resulting composite material (sheet-like material) around a mandrel while heating it to a temperature at which PPS is melted to compression-mold the composite, thereby producing a tubular article.

However, these known processes are all inferior in productivity due to their complexity in forming operation, and can improve neither the melt extrudability of PPS itself nor the physical properties of resulting formed products.

On the other hand, it has been disclosed in Japanese Patent Application Laid-Open No. 90216/1987 to use a PATE having a melt viscosity of 2,000–40,000 poises (at 310° C. and a shear rate of 200 sec$^{-1}$) and a substantially linear structure for preventing drawdown upon melt forming, thereby producing a tubular extruded article. This PATE is somewhat inferior in crystallinity and hence still insufficient in dimensional stability with crystallization upon forming.

OBJECTS AND SUMMARY OF THE INVENTION

It is an object of this invention to provide a PATE resin composition excellent in melt extrudability (formability and processability) and permitting the provision of extruded products excellent in impact resistance, heat resistance, etc.

Another object of this invention is to provide melt-extruded products by using the PATE resin composition having such excellent properties.

A further object of this invention is to provide, in particular, tubular extruded articles excellent in impact resistance, heat resistance, dimensional stability, etc. from the PATE resin composition.

The present inventors have carried out an extensive investigation with a view toward solving the problems involved in the prior art. As a result, it has been found that the use, as a forming material, of a resin composition obtained by blending a PATE great in shear rate dependence of melt viscosity and low in crystallization temperature and a PATE small in shear rate dependence of melt viscosity and high in crystallization temperature in a specific proportion makes drawdown upon melt extrusion small, improves formability and processability, and surprisingly permits the provision of formed products enhanced in heat resistance and impact resistance.

The present invention has been led to completion on the basis of this finding.

According to the present invention, there is thus provided a poly(arylene thioether) resin composition comprising:

100 parts by weight of a poly(arylene thioether) (A) having a shear rate dependence value of melt viscosity at 310° C. of 2.2–3.0 and a crystallization temperature of 175°–210° C., wherein the shear rate dependency value of melt viscosity at 310° C. means a ratio, $\eta_{200}/\eta_{1200}$ of a melt viscosity, $\eta_{200}$ at 310° C. and a shear rate of 200 sec$^{-1}$ to a melt viscosity, $\eta_{1200}$ at 310° C. and a shear rate of 1,200 sec$^{-1}$; and 20–400 parts by weight of a poly(arylene thioether) (B) having a shear rate dependence value of melt viscosity at 310° C. of 1.0–2.0 and a crystallization temperature of 220°–260° C., the resin portion consisting of the poly(arylene thioethers) (A) and (B) in said resin composition having a melt viscosity of 1,400–3,500 poises as measured at 310° C. and a shear rate of 1,200 sec$^{-1}$, a shear rate dependence value of melt viscosity at 310° C. of 1.5–2.3, and a crystallization temperature of 205°–230° C.

According to this invention, there are also provided extruded products, such as a tubular extruded article, obtained by melt-extruding the poly(arylene thioether) resin composition.

DETAILED DESCRIPTION OF THE INVENTION

Features of the present invention will hereinafter be described in detail.

PATE

In this invention, the following two PATEs (A) and (B) are used.

By the way, the term "shear rate dependency value of melt viscosity at 310° C." as used herein means a ratio, $\eta_{200}/\eta_{1200}$ of melt viscosity, $\eta_{200}$ at 310° C. and a shear rate of 200 sec$^{-1}$ to a melt viscosity, $\eta_{1200}$ at 310° C. and a shear rate of 1,200 sec$^{-1}$ in each PATE.

Besides, the term "crystallization temperature" as used herein means an exothermic peak temperature (Tc$_2$) of crystallization, which appears upon the measurement by a differential scanning calorimeter (DSC) when 10 mg of an amorphous sheet, which has been produced by preheating a sample PATE for 2 minutes at 320° C. in a nitrogen atmosphere, pressing it for 1 minute and then quenching the thus-pressed sample PATE, is cooled from 340° C. at a rate of 10° C./min in a nitrogen atmosphere.

Poly(arylene thioether) (A)

The PATE (A) useful in the practice of this invention is a polymer having, as a main constituent, recurring units of the formula

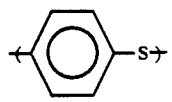

in a proportion of at least 50 wt. %, preferably, at least 70 wt. %. Any proportions of the recurring units less than 50 wt. % will result in a resin composition reduced in physical properties such as heat resistance and mechanical properties.

Exemplary recurring units other than the above recurring units may include m-phenylene sulfide units, diphenyl sulfone sulfide units, diphenyl sulfide units, diphenyl ether sulfide units and 2,6-naphthalene sulfide units.

The PATE (A) employed in this invention is a polymer having a shear rate dependence value of melt viscosity at 310° C. of 2.2–3.0, preferably, 2.25–2.8 and a crystallization temperature of 175°–210° C., preferably, 180°–205° C.

Any shear rate dependence values of the PATE (A) less than 2.2 make it difficult to keep the shear rate dependence value of a resulting resin composition at 1.5 or more when blended with the PATE (B), so that the elasticity of the resin composition becomes insufficient upon its melt extrusion, resulting in great drawdown, small die swell and inferior shape retention of the resin composition extruded. Therefore, the desired improving effect on formability and processability cannot be attained. On the other hand, if the value exceeds 3.0, the melt elasticity of a resulting resin composition is too great, resulting in a formed product lowered in dimensional accuracy or reduced in crystallinity. Any shear rate dependence values outside the above range are hence not preferred.

If the crystallization temperature of the PATE (A) exceeds 210° C., the crystallization or solidification speed in a cooling process of the resin composition extruded through a die upon its melt extrusion is too fast, so that the resin composition extruded is broken upon its taking-off or an extruded product inferior in dimensional accuracy can only be obtained. If the crystallization temperature is lower than 175° C. on the contrary, a resin composition reduced in crystallinity can only be obtained, so that it is impossible to obtain a formed product excellent in appearance because the product is deformed upon its heat treatment after the forming.

Incidentally, it is desirable that the PATE (A) should have a melt viscosity, preferably, 3,000–7,000 poises, more preferably, 3,500–6,000 poises as measured at 310° C. and a shear rate of 1,200 sec$^{-1}$. Any melt viscosities of the PATE (A) lower than 3,000 poises result in a resin composition good in flowability, but insufficient in melt elasticity, so that it is impossible to sufficiently bring about the improving effect on formability by which the drawdown is made small and the die swell is made great. On the contrary, if the melt viscosity exceeds 7,000 poises, the flowability of the resin composition becomes lower and its melt formability is reduced, so that neither a resin composition having sufficient formability nor a formed product having sufficient impact resistance can be obtained even when the PATE (B) is blended.

No particular limitation is imposed on the preparation process of the PATE (A) so long as a resulting PATE (A) has the above-described physical properties. It can be prepared by polymerizing an alkali metal sulfide and a dihalo-aromatic compound in the presence of water in an organic amide solvent, for example, in accordance with the process described in U.S. Pat. No. 4,645,826.

It is preferable that the PATE (A) employed in this invention is a substantially linear polymer. The term "substantially linear polymer" as used herein means a polymer substantially obtained from a monomer composed principally of a bifunctional monomer. Incidentally, PATEs in which a partially branched structure has been introduced by copolymerizing a polyhalogenated benzene such as trichlorobenzene as a minor component may suitably be used.

Poly(arylene thioether) (B)

The PATE (B) useful in the practice of this invention is a polymer having, as a main constituent, recurring units of the formula

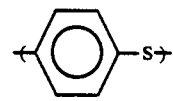

in a proportion of at least 50 wt. %, preferably, at least 70 wt. %. Any proportions of the recurring units less than 50 wt. % will result in a resin composition lowered in physical properties such as heat resistance and mechanical properties.

The PATE (B) is a polymer having a shear rate dependence value of melt viscosity at 310° C. of 1.0–2.0, preferably, 1.05–1.8 and a crystallization temperature of 220°–260° C., preferably, 230°–255° C.

If the shear rate dependence value of the PATE (B) exceeds 2.0, the melt elasticity of a resulting resin composition is too great, so that it is hard to obtain a formed product excellent in geometric accuracy. If the shear rate dependence value is less than 1.0, the melt elasticity of a resulting resin composition becomes insufficient, resulting in a formed product reduced in dimensional accuracy.

If the crystallization temperature of the PATE (B) is lower than 220° C., it is impossible to fully improve the crystallinity of a resulting resin composition. If the crystallization temperature exceeds 260° C. on the contrary, the crystallinity of a resulting resin composition is too high, and hence the crystallization or solidification speed of the resin composition extruded through a die is fast, so that the resin composition extruded is broken upon its taking-off or a formed product inferior in appearance can only be obtained.

Further, it is desirable that the PATE (B) should have a melt viscosity of 200–2,000 poises, preferably, 300–1,800 poises as measured at 310° C. and a shear rate of 1,200 sec$^{-1}$. Any melt viscosities of the PATE (B) lower than 200 poises fail to bring about the improving effect on the formability of the resin composition. On the contrary, if the melt viscosity exceeds 2,000 poises, the flowability of the resin composition is lowered and moreover, it is impossible to fully bring about the effect enhancing the crystallinity of the resin composition.

No particular limitation is imposed on the preparation process of the PATE (B) so long as a resulting PATE (B) has the above-described physical properties. It can suitably be obtained, for example, by treating a polymer obtained in accordance with the process described in U.S. Pat. No. 4,645,826 with an aqueous solution of a salt of a non-oxidizing strong acid with a weak base, such as an aqueous solution of ammonium chloride, to raise the melt crystallization temperature of the polymer.

It is preferable that the PATE (B) employed in this invention is a substantially linear polymer. The term "substantially linear polymer" as used herein means a polymer substantially obtained from a monomer composed principally of a bifunctional monomer. Incidentally, PATEs in which a partially branched structure has been introduced by copolymerizing a polyhalogenated benzene such as trichlorobenzene as a minor component may suitably be used.

Resin Composition

The resin composition according to this invention contains the PATE (B) in a proportion of 20–400 parts by weight, preferably, 30–300 parts by weight per 100 parts by weight of the PATE (A). Any proportions of the PATE (B) less than 20 parts by weight result in a formed product insufficient in physical properties such as heat resistance. On the contrary, any proportions exceeding 400 parts by weight result in a resin composition good in heat resistance but reduced in formability and impact resistance. It is not hence preferable to contain the PATE (B) in any proportions outside the above range.

The resin composition according to this invention may optionally contain one or more inorganic fillers, other thermoplastic resins and/or various kinds of additives such as antioxidants. However, the resin portion consisting of the PATE (A) and the PATE (B) in the resin composition should have a melt viscosity of 1,400–3,500 poises, preferably, 1,500–3,300 poises as measured at 310° C. and a shear rate of 1,200 sec$^{-1}$, a shear rate dependence value of melt viscosity at 310° C. of 1.5–2.3, preferably, 1.6–2.2, and a crystallization temperature of 205°–230° C., preferably, 210°–255° C.

Any melt viscosities of the resin portion lower than 1,400 poises make it difficult to melt-extrude the resin composition due to too great drawdown upon its melt extrusion. On the contrary, any melt viscosities exceeding 3,500 poises lower the flowability of the resin composition, so that the extrudability of the resin composition is reduced.

Any shear rate dependence values of the resin portion less than 1.5 make the elasticity of the resin composition insufficient upon its melt extrusion, so that it is impossible to obtain an extruded product excellent in dimensional accuracy due to great drawdown, small die swell and inferior shape retention of the resin composition extruded. On the other hand, if the shear rate dependence value exceeds 2.3, the elasticity of the resin composition is too great upon its melt extrusion, so that it is also impossible to obtain a formed product excellent in dimensional accuracy.

Further, any crystallization temperatures of the resin portion lower than 205° C. result in a formed product of reduced crystallinity and insufficient heat resistance. If the crystallization temperature exceeds 230° C., the heat resistance of a resulting formed product is improved, but its impact resistance is reduced on the other hand.

As described above, in order to enhance both formability and physical properties of the resin composition and achieve the objects of the present invention, it is essential that the characteristic values of the resin portion consisting of the PATE (A) and the PATE (B) in the resin composition of this invention fall within the above-described respective ranges.

Optional components

The resin composition according to this invention may contain various kinds of optional components in addition to the resin portion consisting of the PATE (A) and the PATE (B) as desired.

In the resin composition of this invention, may be incorporated, as an inorganic filler, for example, a particulate, powdery or scaly filler such as silica, alumina, talc, mica, kaolin, clay, silica-alumina, titanium oxide, calcium carbonate, calcium silicate, calcium phosphate, calcium sulfate, magnesium carbonate, magnesium oxide, magnesium phosphate, silicon nitride, glass, hydrotalcite or zirconium oxide, or a fibrous filler such as glass fibers, potassium titanate fibers, carbon fibers or mica ceramic fibers.

These inorganic fillers may be used either singly or in combination. Besides, these inorganic fillers may be treated with a silane coupling agent or a titanate coupling agent prior to their use. The proportion of the filler to be incorporated is usually 70 wt. % or less viewed from the points of melt processability and the like.

In the resin composition of this invention, thermoplastic resins hard to undergo thermal decomposition in the temperature range suited for the melt forming of PATE (usually, 200°–380° C.), for example, polyamides, polyether ether ketones, polysulfones, polyether sulfones, poly(phenylene ethers), polycarbonates, polyalkylene terephthalates, polyolefins, polystyrenes, ABS resins, polyvinylidene fluorides, polytetrafluoroethylenes, tetrafluoroethylene copolymers and the like may be incorporated, as a thermoplastic resin component other than the PATEs, either singly or in combination. The proportion of these thermoplastic resins to be incorporated is usually 40 wt. % or less viewed from the points of heat resistance, corrosion resistance, chemical resistance, flame retardance and the like.

Besides, various kinds of additives such as an antioxidant, heat stabilizer, lubricant, mold-releasing agent and colorant may be incorporated as needed.

No particular limitation is imposed on the method of mixing the above-mentioned components. They may be mixed by a method generally used, for example, by mixing the individual components in a mixer such as a Henschel mixer.

Formed Product

No particular limitation is imposed on the process for forming the resin compositions according to this invention. There may be used a process wherein a powdery mixture is formed by means of a melt extruder as is, or a process in which a powdery mixture is melt-formed in the form of a pellet and the thus-formed pellets are then formed by a conventional melt extruder.

The resin compositions according to this invention are excellent in extrudability in particular, and can be formed into various extruded products. Among others, they are suitable for use as raw materials for tubular extruded articles.

A tubular extruded article is generally produced by heating and melting a polymer, extruding the resulting melt through a die having an opening defined in a ring shape to size the melt into a tubular form and then taking off and cutting the tubular extrudate. To the resin compositions of the present invention, can be applied such a forming process, thereby forming tubular extruded articles having good heat resistance and impact resistance with good formability.

Since the tubular extruded articles according to this invention have good heat resistance and impact resistance and hence can be sterilized by boiling or steam, they can be used in application fields such as pipings for medical service, chemical plants and food, pipings for warm and hot water, heat exchangers, and pipings for steam. In addition, they are also useful, for example, as pipings for electric wires, in which flame retardance is required, and pipes and tubes, which are used in an atmosphere such as a strong acid, strong base or organic solvent.

ADVANTAGES OF THE INVENTION

According to the present invention, there are provided poly(arylene thioether) resin compositions excellent in melt extrudability and superb in various physical properties such as impact resistance and heat resistance.

The resin compositions according to this invention are suitable for use in extrusion in particular, and can permit the provision of tubular extruded articles excellent in impact resistance, heat resistance and the like with good formability.

EMBODIMENTS OF THE INVENTION

The present invention will hereinafter be described specifically by the following synthesis experiments, examples and comparative examples. It should however be borne in mind that the present invention is not limited to the following examples only.

Incidentally, the following methods were followed for the measurement of the physical properties in the following examples.

Melt viscosity

The melt viscosity of each sample was measured at 310° C. and a shear rate of 1,200 sec$^{-1}$ by a "Capirograph" (manufactured by Tóyo Seiki Seisakusho, Ltd.) equipped with a nozzle (L/D=10 mm/1 mm).

Shear rate dependence value of melt viscosity

The shear rate dependence value of melt viscosity of each sample was expressed in terms of a ratio, $\eta_{200}/\eta_{1200}$ of a melt viscosity, $\eta_{200}$ at 310° C. and a shear rate of 200 sec$^{-1}$ to a melt viscosity, $\eta_{1200}$ at 310° C. and a shear rate of 1,200 sec$^{-1}$.

Crystallization temperature

The crystallization temperature ($T_{c2}$) of each polymer sample was expressed in terms of an exothermic peak temperature of crystallization, which appears on a chart upon the measurement by a differential scanning calorimeter, "DSC-30" manufactured by Shimadzu Corporation when 10 mg of an amorphous sheet, which had been produced by preheating the polymer sample for 2 minutes at 320° C. in a nitrogen atmosphere, pressing it for 1 minute and then quenching the thus-pressed sample, was cooled from 340° C. at a rate of 10° C./min in a nitrogen atmosphere.

Drop-weight strength

The drop-weight strength of each tubular extruded article was expressed in terms of a height at 50% breakage, $H_{50}$ (cm) in a 25 kg-weight test.
Height at 50% breakage: following ASTM D-2444-65T
Weight: a 25 kg weight with a V-shaped head
Temperature: room temperature
Shape of the pipe tested: 15 cm long The pipe was put on a copper plate 10 mm thick, which was placed on an iron-made table. The weight was dropped on the pipe to break it, whereby the height at 50% breakage was calculated from the drop height of the weight and the breakage rate of the pipe.

Heat distortion temperature

Measured in accordance with ASTM D-648 (load: 264 psi).

SYNTHESIS EXPERIMENT 1

A titanium-lined reactor was charged with 373 kg of hydrated sodium sulfide (solid content: 46.03%) and 800 kg of N-methylpyrrolidone (hereinafter abbreviated as "NMP"). The contents were gradually heated up to about 203° C. in a nitrogen atmosphere to distill off a solution of NMP containing 141 kg of water. A mixed solution of 320 kg of p-dichlorobenzene (hereinafter abbreviated as "p-DCB"), 0.395 kg of 1,2,4-trichlorobenzene and 259 kg of NMP was then fed to polymerize them for 5 hours at 220° C.

Then, 97 kg of water was added under pressure to the reaction mixture. The resulting mixture was heated up to 255° C. to polymerize them for 3 hours and thereafter, cooled to 245° C. to polymerize them further for 8 hours.

After cooling the reaction mixture, the contents were collected by filtration, washed with deionized water repeatedly and then dried, thereby obtaining a polymer (PATE-A$_1$).

The PATE-A$_1$ thus obtained was extruded by an extruder to produce pellets. The melt viscosity, shear rate dependence value and crystallization temperature of the pellet sample were 3,800 poises, 2.28 and 199° C., respectively.

SYNTHESIS EXPERIMENT 2

A titanium-lined reactor was charged with 373 kg of hydrated sodium sulfide (solid content: 46.03%) and 800 kg of NMP. The contents were gradually heated up to about 203° C. in a nitrogen atmosphere to distill off a solution of NMP containing 142 kg of water. A mixed solution of 318 kg of p-DCB, 0.393 kg of 1,2,4-trichlorobenzene and 255 kg of NMP was then fed to polymerize them for 5 hours at 220° C.

Then, 97 kg of water was added under pressure to the reaction mixture. The resulting mixture was heated up to 255° C. to polymerize them for 5 hours and thereafter, cooled to 245° C to polymerize them further for 5.5 hours.

After cooling the reaction mixture, the contents were collected by filtration, washed with deionized water repeatedly and then dried, thereby obtaining a polymer (PATE-$A_2$)

The PATE-$A_2$ thus obtained was extruded by an extruder to produce pellets. The melt viscosity, shear rate dependence value and crystallization temperature of the pellet sample were 4,250 poises, 2.64 and 185° C., respectively.

SYNTHESIS EXPERIMENT 3

A titanium-lined reactor was charged with 373 kg of hydrated sodium sulfide (solid content: 46.03%) and 800 kg of NMP. The contents were gradually heated up to about 203° C. in a nitrogen atmosphere to distill off a solution of NMP containing 142 kg of water. A mixed solution of 315 kg of p-DCB, 0.778 kg of 1,2,4-trichlorobenzene and 255 kg of NMP was then fed to polymerize them for 5 hours at 220° C.

Then, 97 kg of water was added under pressure to the reaction mixture. The resulting mixture was heated up to 255° C. to polymerize them for 5 hours and thereafter, cooled to 245° C. to polymerize them further for 5.5 hours.

After cooling the reaction mixture, the contents were collected by filtration, washed with deionized water repeatedly and then dried, thereby obtaining a polymer (PATE-$A_3$).

The PATE-$A_3$ thus obtained was extruded by an extruder to produce pellets. The melt viscosity, shear rate dependence value and crystallization temperature of the pellet sample were 6,000 poises, 2.89 and 200° C., respectively.

SYNTHESIS EXPERIMENT 4

A titanium-lined reactor was charged with 370 kg of hydrated sodium sulfide (solid content: 46.4%) and 800 kg of NMP. The contents were gradually heated up to about 203° C. in a nitrogen atmosphere to distill off a solution of NMP containing 144 kg of water. Next, 4 kg of water was added further, and a mixed solution of 320 kg of p-DCB and 280 kg of NMP was then fed to polymerize them for 4 hours at 220° C.

Then, 110 kg of water was added under pressure to the reaction mixture. The resulting mixture was heated up to 260° C. to polymerize them further for 5 hours. After cooling the reaction mixture, it was sifted through a screen with a mesh size of 0.1 mm to separate particles of a resulting polymer from the reaction mixture. The reaction mixture was washed with methanol and then water to obtain a polymer in the form of a slurry. The slurry was then poured into a 2% aqueous solution of ammonium chloride to treat it for 30 minutes at 40° C. The slurry thus treated was then washed with water and dried to obtain a polymer (PATE-$B_1$)

The PATE-$B_1$ thus obtained was extruded by an extruder to produce pellets. The melt viscosity, shear rate dependence value and crystallization temperature of the pellet sample were 1,200 poises, 1.55 and 247° C., respectively.

SYNTHESIS EXPERIMENT 5

A titanium-lined reactor was charged with 373 kg of hydrated sodium sulfide (solid content: 46.03%) and 880 kg of NMP. The contents were gradually heated up to about 203° C. in a nitrogen atmosphere to distill off a solution of NMP containing 135 kg of water. Next, 314 kg of p-DCB was charged to polymerize them for 4.5 hours at 220° C.

Then, 47.5 kg of water was added under pressure to the reaction mixture. The resulting mixture was heated up to 255° C. to polymerize them further for 4 hours.

After cooling the reaction mixture, it was sifted through a screen with a mesh size of 0.1 mm to separate particles of a resulting polymer from the reaction mixture. The reaction mixture was washed with methanol and then water to obtain a polymer in the form of a slurry. The slurry was then poured into a 2% aqueous solution of ammonium chloride to treat it for 30 minutes at 40° C. The slurry thus treated was then washed with water and dried to obtain a polymer (PATE-$B_2$).

The PATE-$B_2$ thus obtained was extruded by an extruder to produce pellets. The melt viscosity, shear rate dependence value and crystallization temperature of the pellet sample were 300 poises, 1.06 and 255° C., respectively.

SYNTHESIS EXPERIMENT 6

A titanium-lined reactor was charged with 20 moles of hydrated sodium sulfide ($Na_2S.5H_2O$) and 11.0 kg of NMP. The contents were gradually heated up to about 200° C. in a nitrogen atmosphere to distill off 1.27 kg of water, 1.57 kg of NMP and 0.46 mole of $H_2S$. After cooling the resultant mixture to 130° C., 19.73 moles of p-DCB and 3.2 kg of NMP were added to polymerize them for 9 hours at 210° C.

Water was then added to the polymerization system in such a manner that the water content in the polymerization system was 4.7 in terms of $H_2O/Na_2S$ (mole/mole). The resultant mixture was heated up to 260° C. in a nitrogen atmosphere to polymerize them for 5 hours and thereafter, cooled to 245° C. to polymerize them further for 3 hours. After cooling the reaction mixture, the contents were collected by filtration, washed with deionized water repeatedly and then dried for 3 hours at 100° C., thereby obtaining a polymer (PATE-C).

The PATE-C thus obtained was extruded by an extruder to produce pellets. The melt viscosity, shear rate dependence value and crystallization temperature of the pellet sample were 2,900 poises, 1.90 and 180° C., respectively.

The characteristic values of the respective polymers obtained in Synthetic Experiments 1–6 are shown collectively in Table 1.

TABLE 1

|  | Melt viscosity (poise) | Shear rate dependence value | Crystallization temperature (°C.) |
| --- | --- | --- | --- |
| PATE-$A_1$ | 3,800 | 2.28 | 199 |

TABLE 1-continued

|         | Melt viscosity (poise) | Shear rate dependence value | Crystallization temperature (°C.) |
|---------|------------------------|------------------------------|-----------------------------------|
| PATE-A$_2$ | 4,250 | 2.64 | 185 |
| PATE-A$_3$ | 6,000 | 2.89 | 200 |
| PATE-B$_1$ | 1,200 | 1.55 | 247 |
| PATE-B$_2$ | 300   | 1.06 | 255 |
| PATE-C  | 2,900 | 1.90 | 180 |

EXAMPLE 1

With 100 parts by weight of PATE-A$_1$ obtained in Synthetic Experiment 1, were blended 33 parts by weight of PATE-B$_1$ obtained in Synthetic Experiment 4 in a twin-screw kneading and extruding machine, thereby preparing pellets. Using the pellets thus obtained, a tubular extruded article having an outer diameter of 32 mm and thickness of 3.4 mm was obtained by extrusion.

The height at 50% breakage in the 25 kg-weight test and heat distortion temperature (HDT) of the tubular extruded article thus obtained were 25 cm and 128° C., respectively.

The properties of the resin composition in this example and the performance characteristics of the extruded article are shown collectively together with those in the following examples and comparative examples in Table 2.

EXAMPLES 2-3

Respective tubular extruded articles were obtained in the same manner as in Example 1 except that the proportions of PATE-B$_1$ to be blended were changed to 100 parts by weight (Example 2) and 300 parts by weight (Example 3).

COMPARATIVE EXAMPLES 1-3

Respective tubular extruded articles were obtained in the same manner as in Example 1 except that only PATE-A$_1$ (Comparative Example 1), only PATE-A$_2$ (Comparative Example 2) and only PATE-B$_1$ (Comparative Example 3) were used as the polymer component.

The tubular extruded articles in Comparative Examples 1 and 2 were not crystallized and were deformed upon crystallization by a heat treatment at 120° C. On the other hand, the tubular extruded article in Comparative Example 3 had extremely poor impact resistance.

EXAMPLE 4

A tubular extruded article was obtained in the same manner as in Example 1 except that 25 parts by weight of PATE-B$_2$ were blended instead of PATE-B$_1$.

EXAMPLE 5

A tubular extruded article was obtained in the same manner as in Example 1 except that 100 parts by weight of PATE-B$_1$ were blended with 100 parts by weight of PATE-A$_2$.

COMPARATIVE EXAMPLE 4

A tubular extruded article was obtained in the same manner as in Example 1 except that 100 parts by weight of PATE-B$_2$ were blended with 100 parts by weight of PATE-A$_1$. The extruded article thus obtained had extremely poor impact resistance.

COMPARATIVE EXAMPLES 5-6

Respective tubular extruded articles were obtained in the same manner as in Example 1 except that 20 parts by weight of PATE-B$_1$ (Comparative Example 5) and 20 parts by weight of PATE-B$_2$ (Comparative Example 6) were blended with 100 parts by weight of PATE-A$_2$. Both extruded article thus obtained were not crystallized and deformed upon crystallization by a heat treatment.

COMPARATIVE EXAMPLE 7

In order to obtain a tubular extruded article, extrusion was conducted in the same manner as in Example 1 except that 400 parts by weight of PATE-B$_2$ were blended with 100 parts by weight of PATE-A$_1$. The solidification speed of the resin composition extruded through a die was fast, so that the breaking of the extrudate occurred upon its taking-off and it was hence impossible to obtain a tubular extruded article.

COMPARATIVE EXAMPLES 8

A tubular extruded article was obtained in the same manner as in Example 1 except that 200 parts by weight of PATE-C were blended with 100 parts by weight of PATE-A$_1$. The extruded article thus obtained was inferior in both impact resistance and heat resistance.

COMPARATIVE EXAMPLE 9

A tubular extruded article was obtained in the same manner as in Example 1 except that 100 parts by weight of PPS "Ryton P-4" (trade name; product of Phillips Petroleum Company) were blended with 100 parts by weight of PATE-A$_1$. The extruded article thus obtained had extremely poor impact resistance.

TABLE 2

Properties of compositions and performance characteristics of tubular extruded articles (pipes)

| | Composition | | | | | | Properties of composition | | | Performance of pipe | |
| | PATE (A) | | PATE (B) | | PATE | | Melt viscosity characteristics at 310° C. | | Crystallization temperature | Drop-weight strength | Heat resistance |
| | A$_1$ | A$_2$ | B$_1$ | B$_2$ | C | P-4[*1] | $\eta_{1200}$ (poise) | $\eta_{200}/\eta_{1200}$ | Tc$_2$ (°C.) | H$_{50}$ (cm) | HDT (°C.) |
|---|---|---|---|---|---|---|---|---|---|---|---|
| Ex. 1 | 100 | — | 33 | — | — | — | 2,950 | 2.07 | 210 | 25 | 128 |
| Ex. 2 | 100 | — | 100 | — | — | — | 2,100 | 1.62 | 214 | 20 | 129 |
| Ex. 3 | 100 | — | 300 | — | — | — | 1,540 | 1.62 | 225 | 15 | 129 |
| Ex. 4 | 100 | — | — | 25 | — | — | 2,100 | 2.00 | 214 | 20 | 126 |
| Ex. 5 | — | 100 | 100 | — | — | — | 2,400 | 1.77 | 210 | 20 | 130 |
| Comp. Ex. 1 | 100 | — | — | — | — | — | 3,800 | 2.28 | 199 | —[*2] | —[*2] |
| Comp. Ex. 2 | — | 100 | — | — | — | — | 4,250 | 2.64 | 185 | —[*2] | —[*2] |

TABLE 2-continued

Properties of compositions and performance characteristics of tubular extruded articles (pipes)

| | Composition | | | | | | Properties of composition | | Performance of pipe | |
|---|---|---|---|---|---|---|---|---|---|---|
| | PATE (A) | | PATE (B) | | PATE | | Melt viscosity characteristics at 310° C. | Crystallization temperature | Drop-weight strength | Heat resistance |
| | $A_1$ | $A_2$ | $B_1$ | $B_2$ | C | P-4*[1] | $\eta_{1200}$ (poise) | $\eta_{200}/\eta_{1200}$ | $T_{c2}$ (°C.) | $H_{50}$ (cm) | HDT (°C.) |
| Comp. Ex. 3 | — | — | 100 | — | — | — | 1,200 | 1.55 | 247 | 5> | —*[4] |
| Comp. Ex. 4 | 100 | — | — | 100 | — | — | 1,350 | 1.47 | 228 | 5> | 128 |
| Comp. Ex. 5 | — | 100 | 20 | — | — | — | 3,600 | 2.40 | 195 | —*[2] | —*[2] |
| Comp. Ex. 6 | — | 100 | — | 20 | — | — | 3,200 | 2.38 | 200 | —*[2] | —*[2] |
| Comp. Ex. 7 | 100 | — | — | 400 | — | — | 1,060 | 1.36 | 237 | —*[3] | —*[3] |
| Comp. Ex. 8 | 10 | — | — | — | 200 | — | 3,200 | 2.01 | 186 | 5> | 95 |
| Comp. Ex. 9 | 100 | — | — | — | — | 100 | 2,200 | 2.21 | 212 | 5> | 127 |

*[1]: PPS ("Ryton P-4"; product of Phillips Petroleum Co.; $\eta_{1200}$: 1,300 poises; $\eta_{200}/\eta_{1200}$: 2.17; $T_{c2}$: 226° C.).
*[2]: Performance was immeasurable due to deformation in the course of a heat treatment for crystallization.
*[3]: The pipe was unable to be taken off due to fast solidification speed.
*[4]: Not measured.

EXAMPLES 6-7

Respective tubular extruded articles were obtained in the same manner as in Example 1 except that 50 parts by weight of PATE-$B_1$ (Example 6) and 100 parts by weight of PATE-$B_1$ (Example 7) were blended with 100 parts by weight of PATE-$A_3$.

The properties of the resin compositions in these examples and the performance characteristics of the tubular extruded articles (pipes) thus obtained are shown collectively in Table 3.

TABLE 3

| | Ex. 6 | Ex. 7 |
|---|---|---|
| <Properties of composition> | | |
| Melt viscosity characteristics at 310° C. | | |
| $\eta_{1200}$ (poise) | 3,400 | 2,700 |
| $\eta_{200}/\eta_{1200}$ | 2.21 | 1.85 |
| Crystallization temperature, $T_{c2}$ (°C.) | 208 | 215 |
| <Performance of pipe> | | |
| Drop-weight strength, $H_{50}$ (cm) | 20 | 20 |
| Heat resistance (°C.) | 128 | 129 |

We claim:

1. A poly(arylene thioether) resin composition comprising:

100 parts by weight of a poly(arylene thioether) (A) having a shear rate dependence value of melt viscosity at 310° C. of 2.2-3.0 and a crystallization temperature of 175°-210° C., wherein the shear rate dependency value of melt viscosity at 310° C. means a ratio, $\eta_{200}/\eta_{1200}$ of a melt viscosity, $\eta_{200}$ at 310° C. and a shear rate of 200 sec$^{-1}$ to a melt viscosity, $\eta_{1200}$ at 310° C. and a shear rate of 1,200 sec$^{-1}$; and 20-400 parts by weight of a poly(arylene thioether) (B) having a shear rate dependence value of melt viscosity at 310° C. of 1.0-2.0 and a crystallization temperature of 220°-260° C., the resin portion consisting of the poly(arylene thioethers) (A) and (B) in said resin composition having a melt viscosity of 1,400-3,500 poises as measured at 310° C. and a shear rate of 1,200 sec$^{-1}$, a shear rate dependence value of melt viscosity at 310° C. of 1.5-2.3, and a crystallization temperature of 205°-230° C.

2. The poly(arylene thioether) resin composition as claimed in claim 1, wherein the poly(arylene thioethers) (A) and (B) have melt viscosities of 3,000-7,000 poises and 200-2,000 poises, respectively, as measured at 310° C. and a shear rate of 1,200 sec$^{-1}$.

3. An extruded product formed of the poly(arylene thioether) resin composition as claimed in claim 1.

4. The extruded product as claimed in claim 3, which is in the form of a tube or pipe.

* * * * *